United States Patent [19]

Aumann

[11] Patent Number: 4,561,666
[45] Date of Patent: Dec. 31, 1985

[54] OPEN SLEIGH THAT DISASSEMBLES TO A GENERALLY FLAT STORAGE POSITION AND ASSEMBLES INTO AN INTERLOCKED OPERATING POSITION

[76] Inventor: James P. Aumann, 6251 Highway 73, Evergreen, Colo. 80439

[21] Appl. No.: 567,494

[22] Filed: Jan. 3, 1984

[51] Int. Cl.[4] .................. B62B 13/16; B62C 1/02
[52] U.S. Cl. ........................ 280/20; 278/35; 280/24; 296/180
[58] Field of Search .............. 280/20, 24, 12 C, 39, 280/40, 63, 116, 132; 296/180; 278/35

[56] References Cited

U.S. PATENT DOCUMENTS

| | | | |
|---|---|---|---|
| 376,585 | 1/1888 | Crandall | 280/20 |
| 579,917 | 3/1897 | Caffrey | 280/24 |
| 980,604 | 1/1911 | Coleman | 280/20 |
| 1,065,876 | 6/1913 | Kennard | 280/24 |
| 1,111,662 | 9/1914 | McGill | 280/20 |
| 3,912,290 | 10/1975 | Rich | 280/9 |
| 3,982,748 | 9/1976 | Hooper et al. | 280/18 |
| 4,063,746 | 12/1977 | Hansen | 280/16 |
| 4,079,953 | 3/1978 | Howarth, Jr. | 280/19 |
| 4,170,367 | 10/1979 | Richenbacher | 280/18 |
| 4,243,238 | 1/1981 | Johnson | 280/20 |
| 4,245,849 | 1/1981 | Thiboutot | 280/20 |
| 4,254,964 | 3/1981 | Gibson | 280/20 |
| 4,294,457 | 10/1981 | Thiboutot | 280/20 |
| 4,363,495 | 12/1982 | Henson | 280/20 |

FOREIGN PATENT DOCUMENTS

930527  7/1963  United Kingdom ............. 280/20

Primary Examiner—Joseph F. Peters, Jr.
Assistant Examiner—Joseph G. McCarthy
Attorney, Agent, or Firm—Gregg I. Anderson

[57] ABSTRACT

A sleigh for travel over a snow covered surface adapted to be disassembled or knocked down into a storage or transport position, from an operating position, is shown. Runners of the sleigh are pivotally connected to a floorboard along side edges thereof. The runners are locked into an operating position and may be unlocked to fold against a bottom surface of the floorboard in a stored position. An upper body including a seat is formed of multiple planar pieces which are dependently interlocked with each other for assembly and later disassembly. Means are provided for interlocking the runners to a hitching assembly to which a horse is conventionally harnessed.

22 Claims, 18 Drawing Figures

Fig_1

Fig_3

Fig_17

Fig_4

Fig_5

Fig_6

Fig_7

Fig_13

Fig_14

Fig_16

Fig_15

4,561,666

OPEN SLEIGH THAT DISASSEMBLES TO A GENERALLY FLAT STORAGE POSITION AND ASSEMBLES INTO AN INTERLOCKED OPERATING POSITION

BACKGROUND OF THE INVENTION

1. Field of the Invention

The present invention relates to sleighs adapted to be pulled over a snow covered landscape. More particularly, the present invention relates to sleighs and vehicles that fold or collapse to a stored position from an operating position. In the collapsed or folded storage position, the vehicle is easily stored and transported.

2. Description of the Prior Art

Sleighs have been used for many centuries to travel over snow covered landscapes. Far and away the most likely used motive force for such sleighs is one or more horses. The one horse open sleigh is a staple of American folklore that is almost synonymous with the Christmas season.

Yet despite the nostalgic connotations and recreational possibilities associated with such sleighs, relatively few sleighs exist, and most of those are of the antique variety. A major problem associated with the ownership of a sleigh is where to put it when it is not being used. A related problem is how to easily transport the sleigh to where it can be most effectively used.

Owners of sleighs cannot always conveniently store the sleigh for the reason that space is often at a premium. In rural situations, space must be allotted to horses and feed and other implements necessary to care for horses. The best area for use of a sleigh is the rural areas. This often means that the user of a sleigh must haul horses from a metropolitan area to such a rural area. The problem then becomes how to haul both the horse and the sleigh at the same time.

As far as can be determined, no one has heretofore built a horse-drawn sleigh that can be collapsed into a relatively flat, compact or knocked down storage and transport position. No one has made an adjustable width tree to which various sized horses can be secured. Other land vehicles collapsible to a stored position and adapted to move over a snow or ice covered landscape have been known.

A collapsible sled is seen in R. Rich, U.S. Pat. No. 3,912,290, wherein a multisectioned sled has an operative position and a folded position. In the folded position, the longitudinally extending sled is folded about multiple transverse axes into a stacked storage position. Both wheels and runners are shown in association with the sled and the side runners are, as with the other sections of the sled, broken transverse to their length in order to fold the entire sled.

Other collapsible vehicle structures adapted to be pulled over a snow landscape also fold about transverse axes relative to the length. In L. Gibson, U.S. Pat. No. 4,254,964, a collapsible snow sled has a single front steerable runner that pivots about a transverse axis to be stored under a support body in a position between a pair of side runners. In M. Johnson, U.S. Pat. No. 4,243,238, a sled having front and rear portions foldable on top of each other through a transverse hinge is seen. A sliding base is seen in P. Rickenbacher, U.S. Pat. No. 4,170,367, which has a similar folding configuration to that of Johnson. No runners are shown in Rickenbacher. A concept similar to Johnson and Rickenbacher is shown in W. Howarth, U.S. Pat. No. 4,079,953, an ice rescue craft. Hinges transverse to the length of a runnerless vehicle are shown in the foldable toboggan of B. Hooper, U.S. Pat. No. 3,982,748.

A pivotal connection through a transverse axis between a steerable front runner and the body of a sled is shown in O. Hansen, U.S. Pat. No. 4,063,746. O. Hansen provides for stable movement over varying terrain. Folding a pair of skis about a longitudinal axis to a nested position in a ski-like device is shown in K. Henson, U.S. Pat. No. 4,363,495. A coupling device in Henson allows skis that are otherwise fixed relative to each other, to fold into the bottom to bottom nested position for storage. A support structure shown for a folding sled is seen in R. Thiboutet, U.S. Pat. Nos. 4,245,849 and 4,294,457, wherein the structure is collapsible generally into a plane which, in the case of the '457 patent, is a vertically oriented longitudinal plane essentially bisecting the distance between a pair of parallely extending skis.

OBJECTS AND SUMMARY OF THE INVENTION

It is the principal object of the present invention to provide a sleigh to be pulled over a snow covered landscape by a horse, which sleigh can be partially disassembled and collapsed to a compact or knocked down storage or transport configuration.

It is a related object of the present invention to provide a sleigh that can be partially disassembled and collapsed to a knocked down storage position without the use of any tools, and then reassembled in a very short period of time.

It is a further related object of the present invention to provide a sleigh that can be partially disassembled and collapsed to a knocked down storage position and, upon reassembly, has interlocking features which maintain it in a rigid operating position.

In accordance with the objects of the present invention, a sleigh having a pair of generally parallel and longitudinally extending runners is pulled over a snow covered landscape by a horse or horses. The runners of the sleigh are pivotally connected to a base or floorboard along a pair of side edges of the sleigh. The floorboard acts as the primary structure of the sleigh. In an operating position, each runner is generally perpendicular to the floorboard and extends downwardly to contact the snow. In a knocked down storage or transport position, each runner is pivoted to a position generally adjacent to and essentially coplanar with the floorboard.

An upper body of the sleigh includes a pair of side panels, a back panel and two seat pieces. During assembly, the side panels are first mounted on and temporarily held in position with respect to the floorboard. A lower and upper piece form the back panel and laterally interconnect the side panels. The seat pieces include a horizontally aligned piece and a vertically aligned piece. The horizontally aligned or oriented seat piece locks the vertically aligned seat piece in position relative to the body, while securing the upper and lower back pieces in position relative to the floorboard. The horizontally aligned seat piece is mechanically locked relative to the vertical seat piece and the entire body is interlocked into a unit.

The upper body structure defines first interlocking means. The back panel of the upper body, once assembled, defines second interlocking means for maintaining the runners in the operating position. A longitudinally extending slide defines third interlocking means for locking the runners in the operating position. The third interlocking means is held or maintained in position by the second interlocking means.

A front panel is releasably connected to the runners and the floorboard by fourth interlocking means. The front panel is of generally planar construction and includes a runner portion pivotally connected to a front windshield. The front panel is temporarily held in position by placing the runner portion on the runners and the windshield on the runners and abutted against a forward edge of the floorboard. The fourth interlocking means secures the runner portion to the runners. Operation of the fourth interlocking means holds the front windshield in a locked position with respect to the floorboard. The fourth interlocking means also secures a pair of tubular harness supports or shafts to the runners at the connection between the runners and the runner portion.

The harness supports are interconnected by a cross bar and can rotate with respect to each other to a generally flat storage position. The cross bar has pivotally attached thereto a tow bar to which an harness is attached. The harness support shafts further include hold back brackets to which a harness is secured and which prevent the sleigh from striking the horse during a stop. Connecting the harness to the horse completes the assembly of the sleigh into the operating position.

DESCRIPTION OF THE PREFERRED EMBODIMENT

Figure 1:
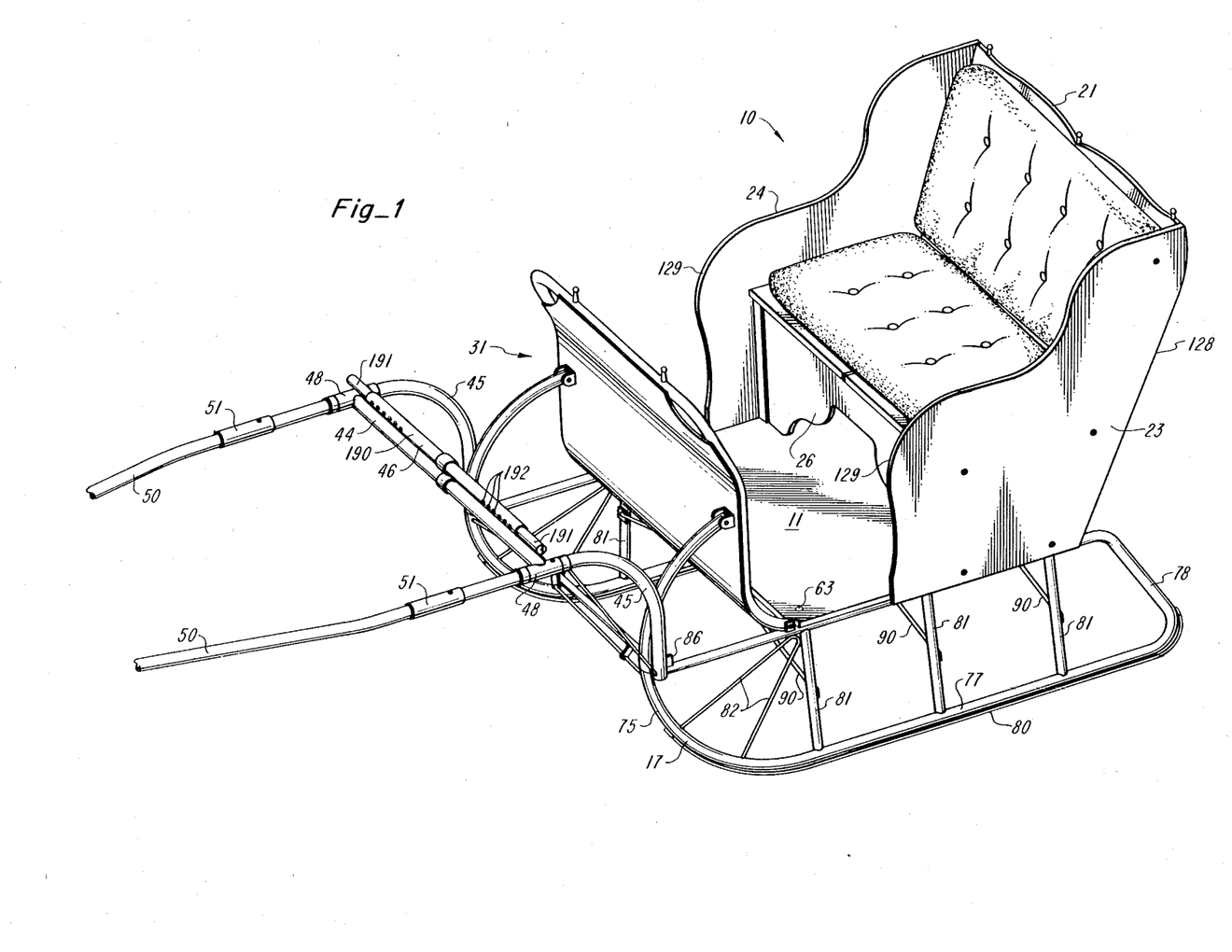
FIG. 1 is a perspective view of a sleigh of the invention assembled in an operating position, portions of a harness support being shown in a fragmented view.
Figure 4:
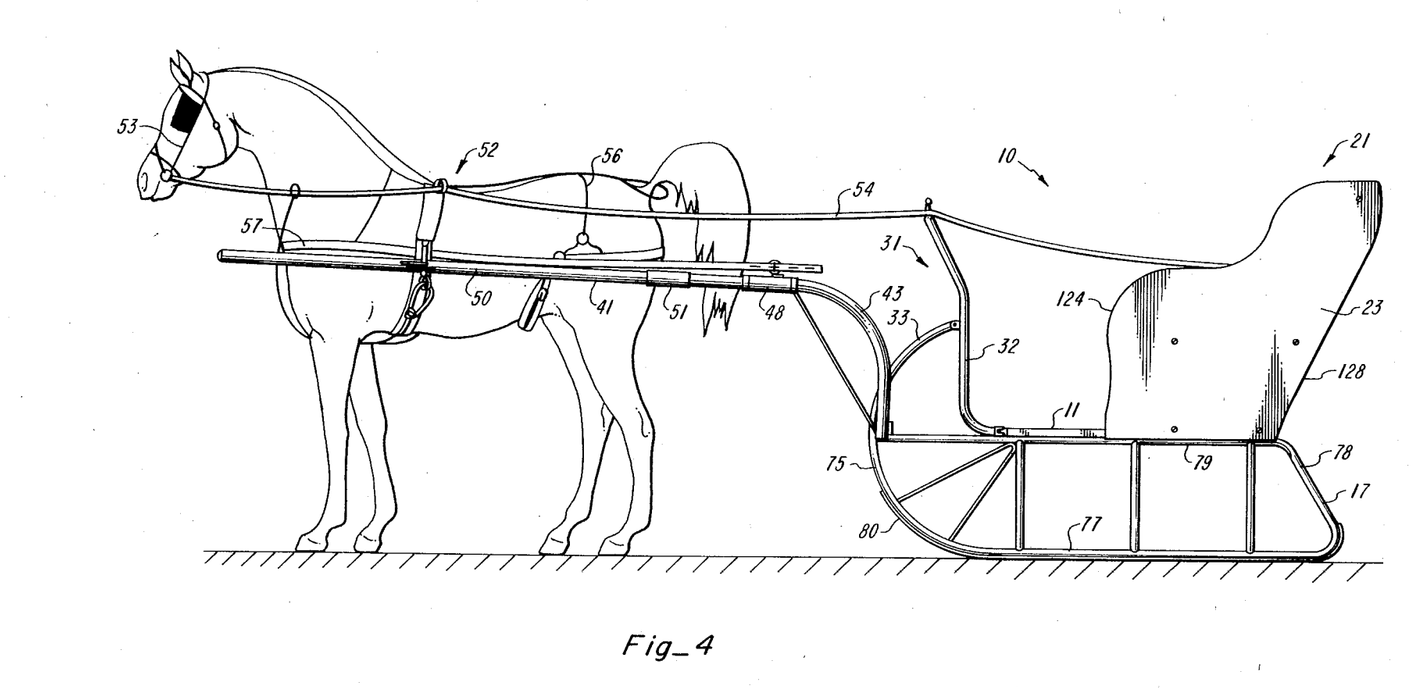
FIG. 4 is a side elevational view of the invention of FIG. 1 attached to a horse.

A collapsible, or knocked down, one-horse open sleigh 10 is shown in an operating position in FIGS. 1 and 4. The sleigh 10 is shown in a storage position, disassembled into a plurality of generally planar or rectangular component parts in FIGS. 2 and 7. The pieces shown generally in FIG. 2 are readily storable for easy transport of the sleigh 10.

Figure 2:
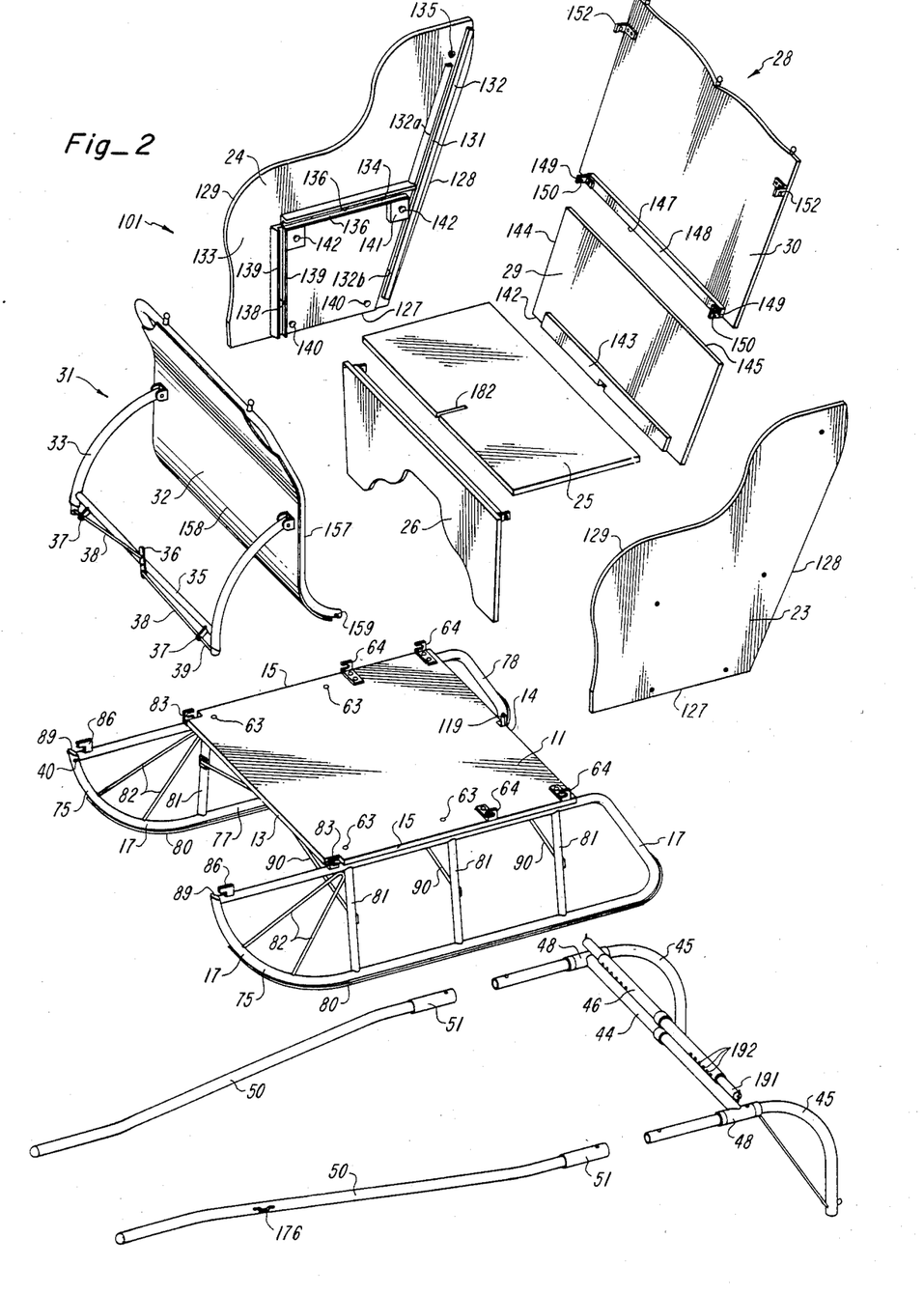
FIG. 2 is an exploded view of FIG. 1.
Figure 5:
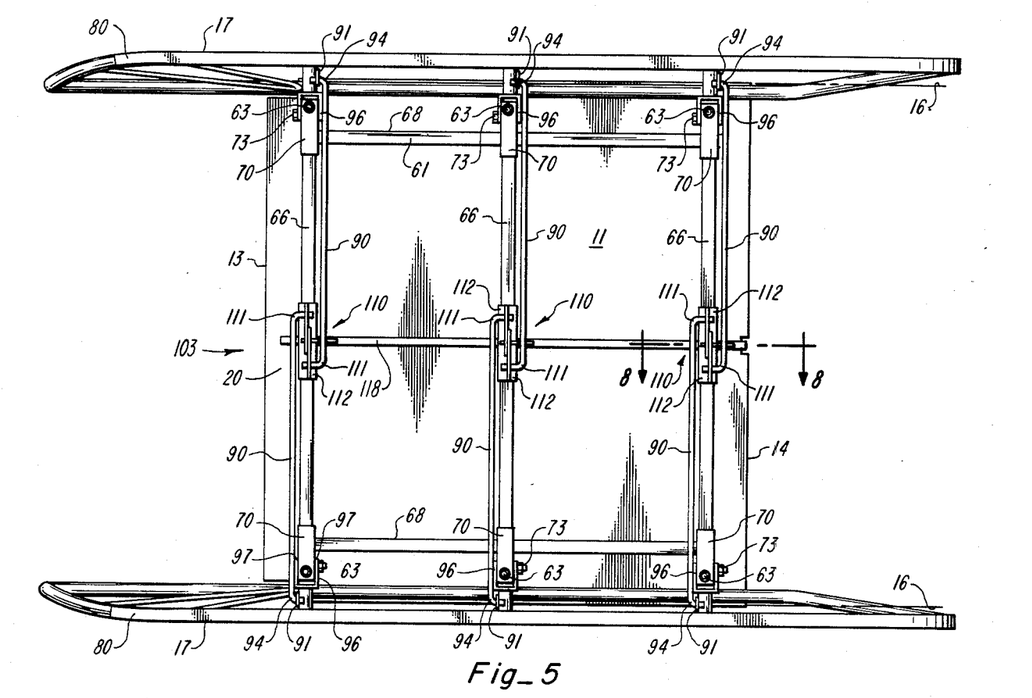
FIG. 5 is a bottom view of a floorboard and runners of the invention shown in FIG. 1, the runners shown in the operating position.
Figure 6:
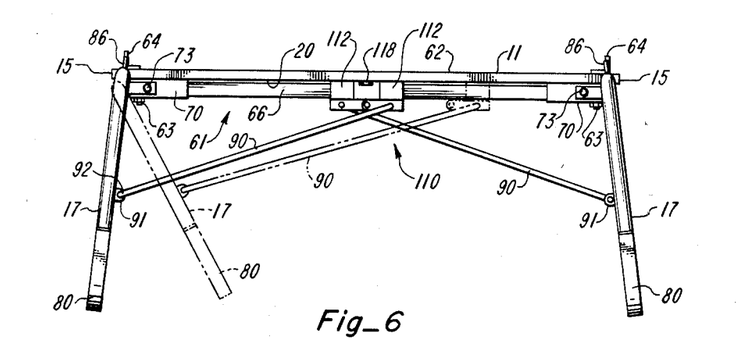
FIG. 6 is a front elevation view of the floorboard and runners of the invention shown in FIG. 1, the runners shown in phantom line moving toward a storage or transport position relative to the floorboard.
Figure 10:
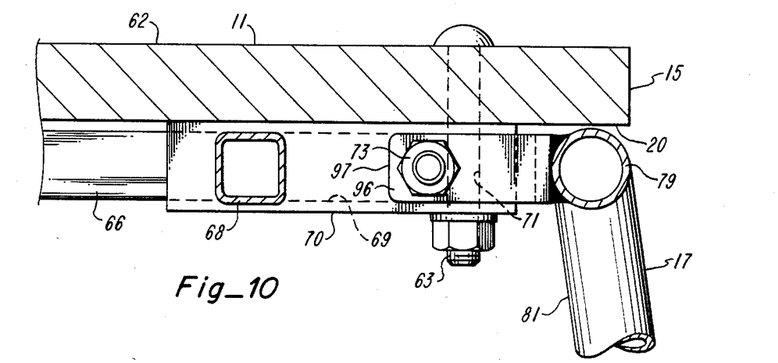
FIG. 10 is an enlarged fragmentary view of a pivotal connection between the runners and the floorboard.

One of the pieces of the sleigh 10 of FIG. 2 is a generally rectangular floorboard 11 having a forward edge 13 and rearward edge 14 and two parallel longitudinally extending side edges 15. The side edges 15 are coincident with a pair of longitudinal axes 16 (FIG. 5). A pair of runners 17 are attached to the floorboard 11 near the side edges 15 in a permanent manner for pivotal movement generally about the longitudinal axes 16 (FIG. 10). The runners 17 selectively assume the operating position, generally perpendicular to the floorboard 11, wherein both runners 17 engage a snow covered landscape or surface 19 in an essentially conventional manner (FIG. 4). In the disassembled configuration of FIG. 2, wherein it is desired to store the sleigh, the runners 17 assume the folded or knocked down storage or transport position (FIG. 7), both runners 17 pivoted to a position adjacent a bottom surface 20 of the floorboard 11 in a plane generally parallel to the plane containing the floorboard 11.

An assembled upper body 21 of the sleigh 10 disassembles into the pieces seen in FIG. 2. The pieces of the upper body 21 include a left side panel 23 and right side panel 24, a horizontal seat piece 25, on which the passengers sit, a vertical seat piece 26, and a back panel 28. The back panel 28 is further divided into a lower back piece 29, mountable adjacent the rearward edge 14 of the floorboard 11, and a coplanar upper back piece 30.

A separate front panel 31, which includes subparts, a windscreen or windshield 32, fitted against the floorboard 11 against the forward edge 13, and a runner portion or extension 33, pivotally connected to the windshield 32. The runner portion 33 forms a smooth continuous curve connection with the runners 17 once the front panel is mounted to the runners and floorboard. A cross or lateral support member 35 (FIG. 17) interconnects the two runner portions 33 of the front panel 31 and has pivotally connected at a midpoint of said length a pivot arm 36. At either end of the relatively short pivot arm 36 is pivotally connected a radius arm or locking rod 38 extending laterally away from the pivot arm 36 through guide 37 and terminating in a pin 39. The pin 39 passes through a hole 40 in both the runner portions 33 and the runners 17, connecting those pieces and defining a portion of fourth interlocking means 104, to be described in detail hereinafter.

Figure 15:
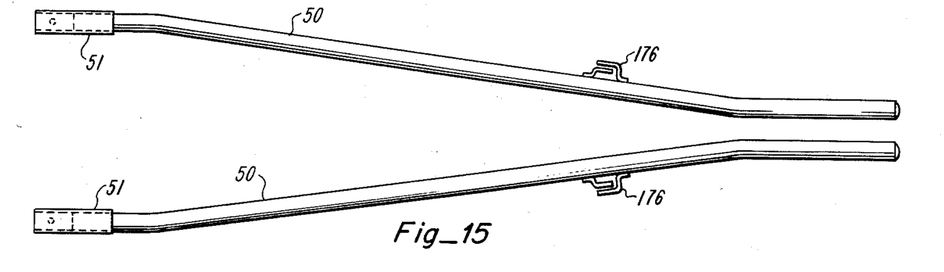
FIG. 15 is a top view of a pair of pole extensions releasably connectable to the harness supports.
Figure 16:
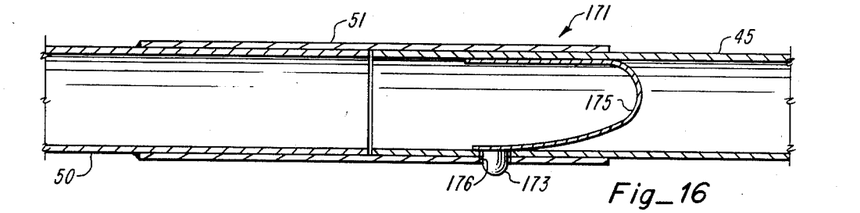
FIG. 16 is a fragmentary sectional view of the connection between the harness supports and the pole extensions.

Horse rigging 41 includes a hitching assembly 43 (FIGS. 1 and 13) including a pair of tubular harness support shafts 45 releasably connected to the runners 17 at the connection of the runner portion 33 of the front panel 31 to the runners 17 (FIG. 4). The hitching assembly 43 is also capable of assuming an operating position and a generally flat planar storage position. The harness support shafts 45 are pivotally connected to sleeves 48, which sleeves 48 are interconnected by a cross member 44 (FIG. 14) extending across the width of the hitching assembly 43, to which cross member 44 is pivotally attached a tow bar 46. The hitching assembly 43 also includes provision for releasably connecting a pair of pole extensions 50 to the harness supports 45. The pole extensions each include a connection sleeve 51 for receiving an end of the harness supports 45 (FIGS. 15 and 16).

Once assembled, it can be seen that the horse rigging 41 of the sleigh 10 functions in a conventional manner. The pole extensions 50 extend either side of the horse while the tow bar 46 passes behind the horse (FIG. 4). An harness 52 includes a bridle 53, reins 54, belly strap 55, hind quarter strap 56 and tow line 57. The harness 52 connects to the harness supports 45 and tow bar 46, as is well known.

Figures 8, 9, 18:
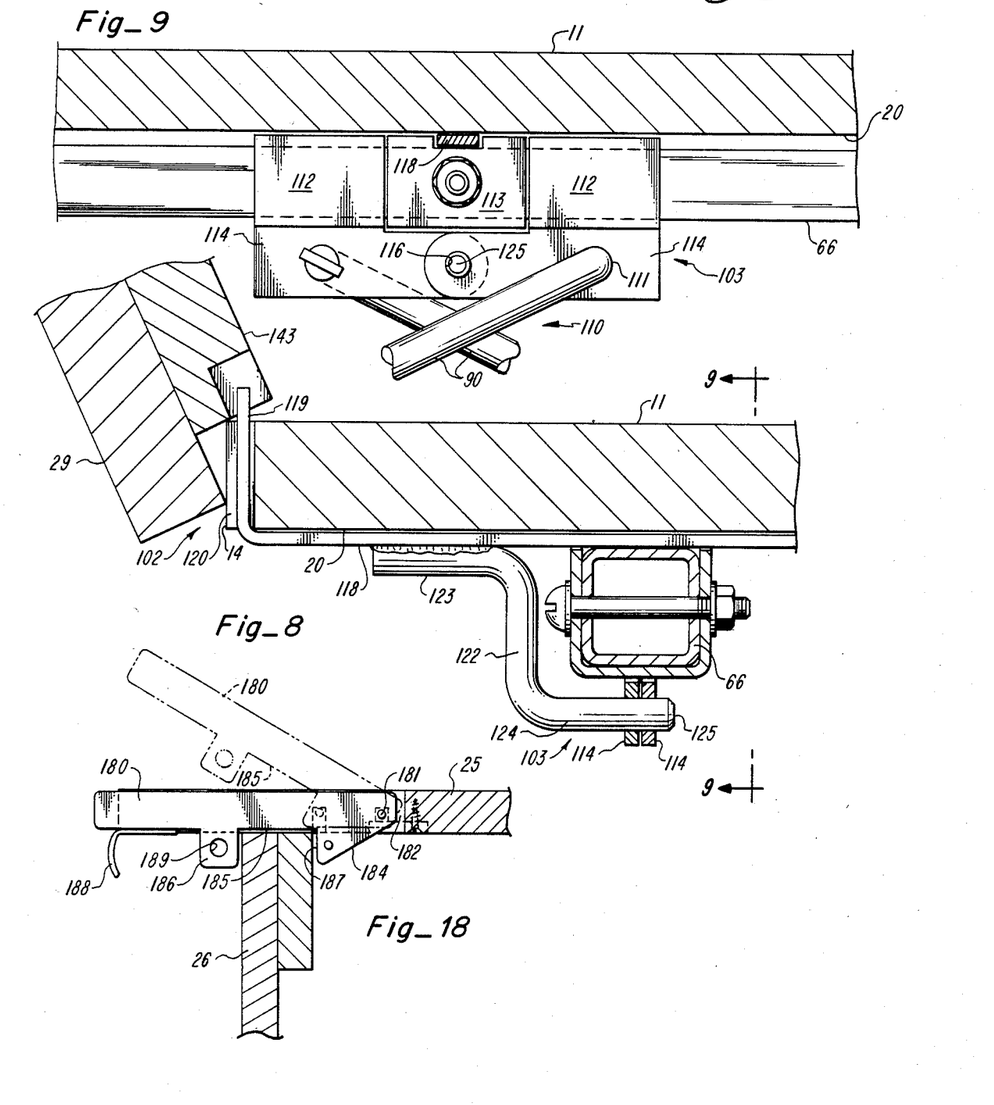
FIG. 8 is an enlarged fragmentary sectional view taken in the plane of line 8—8 of FIG. 5.
FIG. 9 is an enlarged fragmentary sectional view taken along line 9—9 of FIG. 8.
FIG. 18 is a fragmentary side sectional view of a mechanical lock for the seat pieces of the upper body.

Of prime importance to the successful operation of the objects of the invention are first 101, second 102, third 103 and fourth 104 interlocking means, which together insure the stability and rigidity of the sleigh 10 in the assembled operating position. The first interlocking means 101 is defined by the manner in which the right and left side panels 24 and 23, back panel 28 and vertical and horizontal seat pieces 25 and 26 connect together. Once connected together, the foregoing pieces produce the structure of the rigid upper body 21. The assembly of the upper body 21, as will be described hereinafter, and specifically the abutment between the lower back piece 29 and the rearward edge 14 of the floorboard 11 define the second interlocking means 102 for holding the runners 17 in the operating position (FIG. 8).

The third interlocking means 103 is related to the second interlocking means 102 to the extent that the third interlocking means 103 initially locks the runners 17 in the operating position. The second interlocking means 102 secures the third interlocking means 103, holding the runners 17 in the locked operating position. The fourth interlocking means 104 is largely a function of the pivot arm 36 and radius arms 38 of the front panel 31, and locks the front panel 31 to the runners 17, and the floorboard 11, and the hitching assembly 43 to the runners 17 (FIGS. 4, 11, 12 and 17). All the interlocking means will be described in further detail hereinafter.

Figure 3:
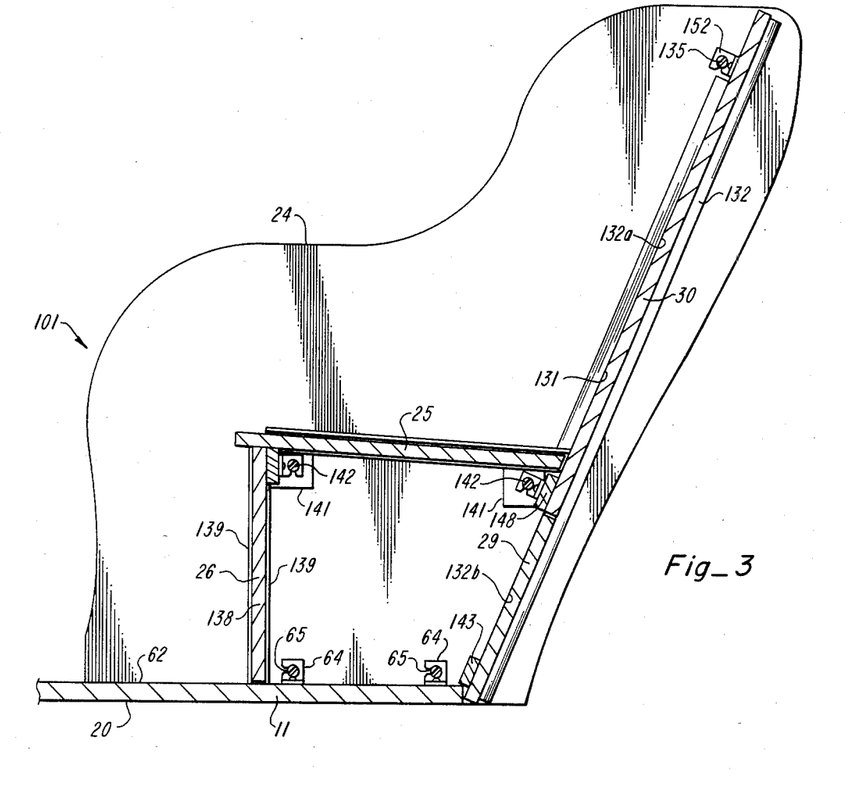
FIG. 3 Is a fragmentary side sectional view of an upper body of the invention of FIG. 1.

The floorboard 11 is of rectangular shape, as previously described, with the exception of a notch 60 formed at each corner defined by the intersection between the forward edge 13 and each side edge 15 and a notch 120 formed at a midpoint of the length of the rear edge 14. The floorboard bottom surface 20 has attached thereto a runner support frame 61 (FIG. 5). On a top surface 62 of the floorboard 11, four L-shaped angles 64 are bolted or otherwise secured at a position generally in the rearward half of the top surface 62 along the side edges 15, each angle 64 defining a corner of a rectangle (FIGS. 2 and 3). Each of the L-shaped angles 64 has a forwardly projecting mouth 65 formed therein which will be seen hereinafter to receive the heads of screws 140 and 144 of the right and left side panels 23 and 24 during the assembly of the sleigh 10 to the operating position.

The runner support frame 61 is formed of tubes of rectangular cross section and is permanently connected, as by bolts 63, to the bottom surface 20 of the floorboard 11. The runner frame 61 includes three transverse tubular members 66 extending essentially from one side edge 15 to the other side edge 15 of the floorboard 11. The transverse members 66 are spaced apart so as to define two generally equal areas along the length of the floorboard. All three transverse tubular members 66 are interconnected by two longitudinal tubular members 68 extending between the forwardmost and rearwardmost transverse tubular members 66 and through the middle transverse tubular member. The longitudinal tubular members 68 are spaced slightly inwardly from the side edges 15 of the floorboard 11.

Projecting ends 69 (FIG. 10) of the transverse tubular members 66 extend past the longitudinal tubular members 68 to the side edges 15 of the floorboard 11 and include an outer spacer 70 rigidly connected thereto. The function of the spacer 70 is to establish a gap between the entire runner frame 61, and particularly the transverse tubular members 66, and the bottom surface 20 of the floorboard 11 so that the runners 17 can fold to the storage position, as will be described hereinafter. The spacer 70 and projecting ends 69 have a vertically aligned bore 71 therethrough which receives the bolts 63 for securing the runner frame 61 to the bottom surface 20 of the floorboard 11. A second bore (not specifically shown) perpendicular to but not intersecting the bore for receiving the bolts 63 is also formed through the projecting ends 69 to receive a bolt 73, providing a portion of a pivotal connection 74, to be described in more detail hereinafter.

Each of the two runners 17 is formed of metal tubing of circular cross section. Each runner therefore includes a forward right angle curved portion 75, a straight rearwardly extending portion 77, a rear portion 78, and a top or support portion 79. The front curved portion 75 and the rearwardly extending portion 77 are welded to a narrow elongated plate bearing surface 80 for extending wear (FIG. 4). The top runner portion 79 is connected to the bottom runner portion 77 by three vertical strut portions 81 of tubular metal of circular transverse cross section. A forwardmost strut 81 of the three struts 81 has a pair of auxiliary struts 82 connected at one end thereof extending radially away to connect to the curved portion 75.

Figures 11, 12:
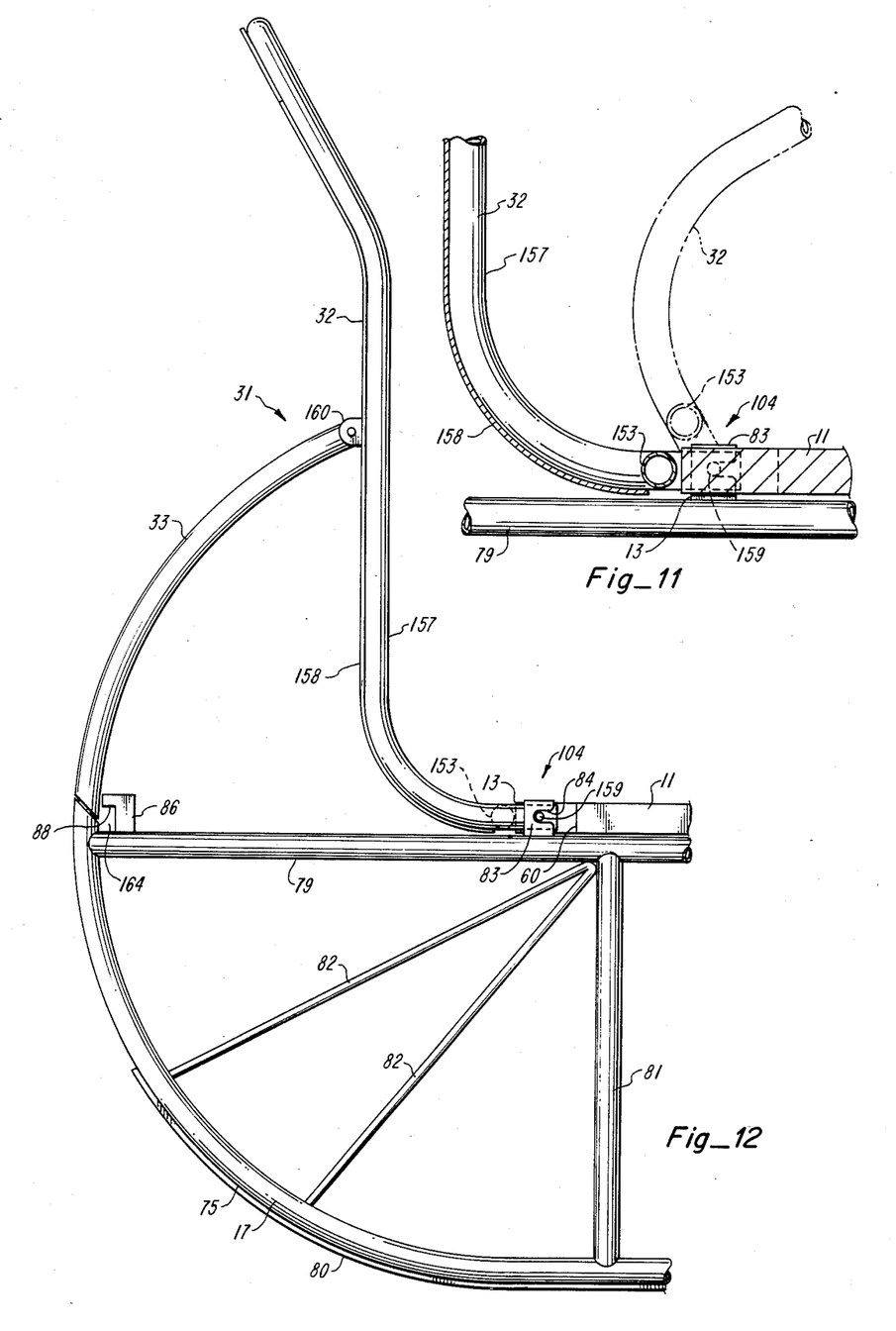
FIG. 11 is a fragmentary side sectional view of a portion of a connection between a front windshield of a front panel to the runners and floorboard, an initial engagement position shown in phantom lines.
FIG. 12 is a view similar to FIG. 11 with a runner portion of the front panel shown connected to the runner.

Additional structure of the top runner portion 79 is involved in the fourth interlocking means 104 for connecting the front panel 31 to the runners 17 and to the floorboard 11 and the hitching assembly 43 to the runners 17. This structure includes a first pair of plates 83 rigidly connected to the top runner portion 79 at the notch 60 in the floorboard 11 (FIG. 12). Each of the first plates 83 has a rearwardly open mouth 84.

At the forwardmost termination of the top runner portion 79, a second pair of plates 86 have a forwardly open mouth. The curved runner portion 75 also defines a portion of the fourth interlocking means 104 by having an opening 89 at the forwardmost termination thereof with the transverse hole 40 formed therethrough (FIG. 2).

The runners 17 also include a portion of the structure necessary for pivoting the runners 17 about the pivotal connection 74 to the storage position (FIGS. 6, 7, 9 and 10). Each vertical strut 81 has a flat connector plate 91 mounted thereto at a position approximately midway along the length. Each connector plate 91 has a hole 92 formed therethrough adapted to receive a right angle bent end 94 of a connecting rod 90. The bent end 94 of the connecting rod 90 is secured to the connecting plate 91 for pivotal connection by any conventional means such as a drift pin or cotter key passing through the bent ends 94.

As seen in FIGS. 5 and 10, the top runner portion 79 has a U-shaped member 96 rigidly connected thereto having holes (not specifically shown) formed through either projecting ear 97 thereof. The projecting ear is spaced apart on either side of the spacer 70 of the runner frame 61 and receives the bolt 73 to thereby define the pivotal connection 74 between the runners 17 and the runner frame 61.

Figure 7:
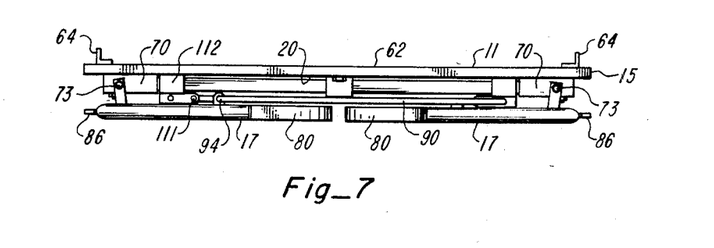
FIG. 7 is a view similar to FIG. 6 wherein the runners are in the storage position.

A sliding mechanism 110 (FIGS. 5, 6, 8 and 9) provides the final interconnection between the runners 17 and the runner frame 61 and permits the runners 17 to fold into a generally flat coplanar position with the floorboard 11 (FIG. 7). A portion of the sliding mechanism 110 is defined by the connecting rods 90. Each connecting rod 90, of which there are six, extends from the connecting plate 91 to a position slightly beyond midway across the width of the bottom surface 20 of the floorboard 11, when the runners 17 are in the operating position. The connecting rod 90 terminates in a second bent end 111 in the general proximity of the bottom surface 20 of the floorboard 11. The second bent end 111 of the connecting rod 90 passes through a hole in a yoke 112 slidable along the transverse members 66 and is riveted, or otherwise connected, for pivotal movement relative thereto. The connecting rods 90 are seen to operate in planes parallel to those containing the sliding yokes 112. A plate 114 of the yoke 112, through which plate the second bent end 111 of the connecting rod 90 passes, moves in a plane parallel to the movement of the connecting rod 90. The rectangular tubular yoke 112 has an inside dimension sufficient to matingly receive the outside dimension of the lateral tubular members 66. The thickness of the yoke 112 is small enough to allow the yoke to move in the gap between the runner frame 61 and the bottom surface 20 of the floorboard 11. The flat connector plate 114 to which the second bent end 111 of each connector rod 90 is attached extends in a direction toward the first bent end 94 of connecting rod 90. A hole 116 formed along a longitudinal axis of the sleigh 10 passes through the plate 114, for a reason to be seen hereinafter.

As can be seen in FIG. 5, each transverse tubular member 66 therefore includes two yokes 112 connected to two connecting rods 90, which connecting rods 90 are pivotally connected to the runners 17 through the connecting plates 91 and to the yokes through plates 114. Folding the runners 17 toward the floorboard bottom surface 20 allows the connecting rod 90 to move the yoke 112 along the transverse tubular member 66 toward the runner 17 at the opposite side edge 15 and ultimately to the generally flat position seen in FIG. 7. The two yokes 112 of a given transverse tubular member 66 abut against each other in a plane defining the midway width of the floorboard 11 when the runners 17 are in the operating position (FIG. 9). The connector plates 114 of the yokes 112 of a given transverse frame member 66 are slightly offset relative to each other so as to lie adjacent to each other when the runners are in the operating position. Each of the holes 116 in the connector plates 114 are in alignment when the runners 17 are in this operating position.

It is also seen that the two connecting rods 90 of the sliding assembly 110 associated with a given transverse tubular member 66 are mirror images of each other about a plane containing the transverse tubular member 66 and perpendicular to the plane of the floorboard 11.

As a result of this arrangement, the connecting rods 90 are free to move the yokes 112 and associated runners 17 without interference from one another.

The third interlocking means 103 (FIGS. 5 and 8) defines the runner locking means for retaining the runners 17 in the operating position. A narrow flat elongated slide 118 is slidably mounted between the stop 113 and bottom surface of the floorboard 11 so as to freely pass beneath the runner frame 61 and the bottom surface 20 of the floorboard. Any conventional means can be used to secure the slide for sliding movement relative to the bottom surface 20 of the floorboard 11. The slide 118 extends the length of the floorboard bottom surface 20 along the midline of the width thereof. A pull tab 119 is provided at a rearward end of the slide 118, which pull tab 119 projects through the rearward notch 120 in the floorboard 11. The slide 118 is movable between two positions, locked runners and unlocked runners.

At a longitudinal position near each of the transverse tubular members 66, the slide 118 has attached thereto a generally S-shaped locking bar 122 having a first flat portion 123 rigidly connected, as by welding, to the slide, and a second flat portion 124 held at a spaced relationship away from the slide 118 forwardly projecting so as to intercept the holes 116 in the connecting plate 114 of the yoke 112. A nose 125 is formed on the second portion 124 to facilitate the mating between the yoke connecting plate hole 116 and the locking bar 122. It will be seen that once the second flat portion 124 passes through the two holes 116 of the two yokes 112 of a given transverse tubular member 66, sliding of the yokes 112 relative to the transverse tubular member 66 cannot occur. The pull tab 119 is held in position to lock the runners 17 by the second interlocking means 102, the lower back piece 29, upon assembly of the upper body 21. The engagement between the pull tab 119 and the lower back panel 29 is seen in FIG. 8.

Upon assembly, the pieces of the upper body 21 are seen to define an essentially conventionally recognized sleigh 10. Accordingly, the side panels 23 and 24 include a bottom edge 127 adapted to fit adjacent the side edges 15 of the floorboard 11. Each side 23 and 24 also includes a rear edge 128 angling obliquely upward and away from the rearward edge 14 of the floorboard 11 when the sides 23 and 24 are mounted thereon. An aesthetically pleasing continuously curving surface 129 interconnects the bottom edge 127 and the rear edge 128 of each of the sides 23 and 24. The continuously curving surface or edge 129 defines a shape that partially screens an individual riding in the sleigh 10 from a wind coming from either side and partially encloses the rider.

Each side panel 23 and 24 also includes, at the rear edge 128, but slightly forwardly displaced therefrom, a rear groove 131 (FIG. 2) defined between two longitudinally extending guides 132, preferably formed of metal and secured to an inside surface 133 of the sides 23 and 24. The rearwardmost of the two guides 132 defining the groove 131 extends substantially the entire height of the rear edge 128 of the sides 23 and 24. The other forwardmost guide 132 forming the groove is defined by an upper and a lower guide piece 132a and 132b, the upper and lower guides 132a and 132b being separated by a horizontal seat groove 134 formed in each side 23 and 24. A connection screw 135 head protrudes above the inside surface 133 of each side 23 and 24 and is located near the uppermost termination of the upper guide 132a.

The horizontal groove 134 slopes rearwardly down to ultimately receive the horizontal seat piece or panel 25 and is defined by two horizontally aligned guides 136 attached to the inside surface 133. At the forwardmost termination of the horizontal groove 134, a vertical groove 138 is defined in each side 23 and 24, again formed by a pair of vertical guide members 139 extending from the level of the horizontal groove 134 to a position near the bottom edge 127 of the sides 23 and 24.

Additional screw connectors are provided for interlocking the upper body. The two screw heads 140 project above the inside surface 133 of the sides 23 and 24 along the bottom edge 127. Two additional screw heads 142 are held at a spaced distance away from the inside surface 133 by a pair of blocks 141 and are generally adjacent to the horizontal groove 134.

As previously described, the back panel 28 includes a lower piece 29 and an upper piece 30. The lower piece 29 is of rectangular configuration and has secured along a substantial portion of a bottom edge 142 thereof a support block 143. Side edges 144 of the lower panel 29 are adapted to be inserted along the rear grooves 131 of the sides 23 and 24. A top edge 145 of the lower panel 29 terminates at approximately a level coincident with that of the almost horizontal groove 134.

The upper piece 30 of the back panel 28 includes a bottom edge 147 that abuts against the top edge 145 of the lower piece 29. Along the bottom edge is located a locking block or bar 148 extending substantially the entire width of the upper piece 30. The locking bar 148 is positioned, upon insertion of the upper panel 30 into the rear groove 131 of the sides 23 and 24, so as to be slightly below the horizontal groove 134 of the sides. At each terminal end thereof, the locking bar includes an L-shaped angle 149 having a downwardly open mouth 150 which engages the screw heads 142, partially inserted into the blocks 141. Along a top edge 151, the upper piece 30 has identical L-shaped angles 152 for engaging the connecting screw heads 135 at the top of the rear groove 131. Accordingly, it is seen that the two sides 23 and 24 are interlocked by the upper and lower pieces 29 and 30 and their L-shaped locking angles 150 and 152, which attach to the screws 142 and 135 of the side panels 23 and 24.

The horizontal seat piece 25 is inserted into the groove 134 of the sides 23 and 24. Additional L-shaped angle connectors 154 of the vertical piece 26 attach to the screws 142 adjacent the vertical groove 138 to align the upper body 21, and temporarily hold the horizontal piece 24 upon insertion of the vertical seat piece 26 into the groove 138. A rear edge of the horizontal seat piece 25 seats against a top surface of the locking bar 148 of the upper back piece 30, which abuts the lower panel 29 and prevents vertical movement of the back panel 28 in the rear track 131. A forward edge 155 of the horizontal seat piece 25 abuts against a top edge 156 of the vertical piece 26 to prevent withdrawal or disconnection of the vertical piece 26 from the vertical groove 138. A lever arm 180 (FIG. 18) is pivotally connected to the horizontal seat piece 25 at 181. The lever arm 180 moves in a slot 182 formed in the piece 25. The arm 180 has a closing ramp 184 and a locking notch 185. A tab 186 of the arm 180 projects below the piece 25 on one side of the vertical piece 26, the ramp 184 having a vertical edge 187 of the arm 180 prevents the horizontal piece 25 from sliding and destroying the interlock 101. The ramp 184 automatically raises the lever 180 as piece 25 is slid into place. A hole 189 in the tab 186 is adapted to receive a padlock. A secured pull tab 188 is connected to piece 25 and pushing tab 186 clear of piece 26 and pulling the tab 188 allows removal of the piece 25.

The upper body 21 consisting of the sides 23 and 24, back panel 28 and seat pieces 25 and 26, is interlocked by the connections mentioned, defining the first interlocking means 101. A rigid unit is available for use.

The front panel windshield portion 32 has a frame 157 formed from a bent curvilinear piece of metal tubing of circular cross section. A tubular cross piece 153 extends across the frame 17. A metal sheet 158 of generally rectangular plan view is secured to the frame 157 at the edges of the sheet 158. At either terminal end of the frame 157 is attached a laterally projecting pin 159 adapted to be received by the pair of brace plates 83 (FIGS. 11 and 12). Once the windshield 32 is pivoted into its operating position (FIG. 12), the terminal ends of the frame 157 abut against the notch 60 and the cross piece 153 abuts the forward edge 13 of the floorboard 11 and, as long as the windshield 32 is held in that orientation, the pins 159 interlock with the brace plates 83, preventing accidental removal therefrom.

The metal sheet 158 of the windshield 32 is attached to the runner portions 33 of the front panel 31 at either side of the windshield 32 by a pair of "U" joints or pin connections 160. The runner portions 33 terminate in a short stub projection 167 secured to the hollow interior of the runner portion 33 (FIG. 17) having the transverse hole 40 formed therethrough. The lateral member 35 has the guides 37 secured thereto, through which the radius arms 38 pass and which direct the pin 39 into the hole 40 in short projection 161 and the runner 17.

Figure 17:
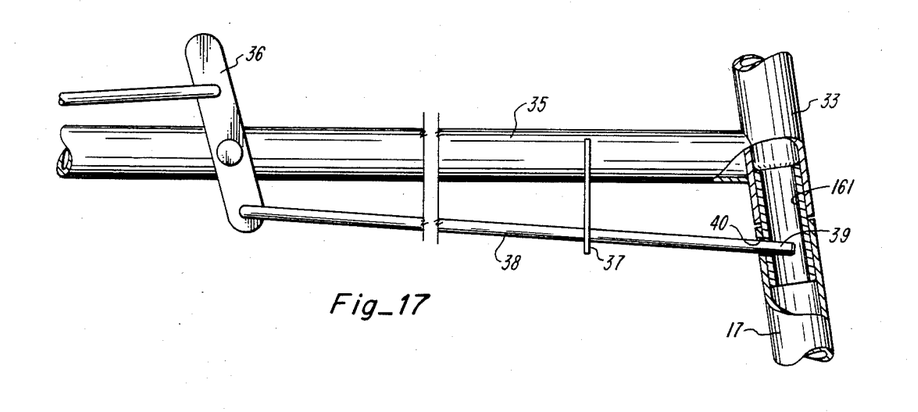
FIG. 17 is a fragmentary front view of the connection between the runner portions to the runners of FIG. 12.

The front panel 31 is interlocked by the fourth interlocking means 104 to the runners 17 and the floorboard 11 by first connecting the lateral pins 159 to the brace portions 83 (FIG. 11). In a manner to be described shortly, the hitching assembly 43 is placed between the second pair of brace plates 86 and the top runner portion 79. The runner portions 33 of the front panel 31 are then pivoted downwardly so that the stub projections 161 are received in the open end of the tubular curved portion 75 of the runner 17 (FIG. 17). Actuation of the pivot arm 36 inserts the radius arms through the holes in the runner portion and the curved runner of the runner 17, locking the runner portion 32 to the runner 17.

Figures 13, 14:
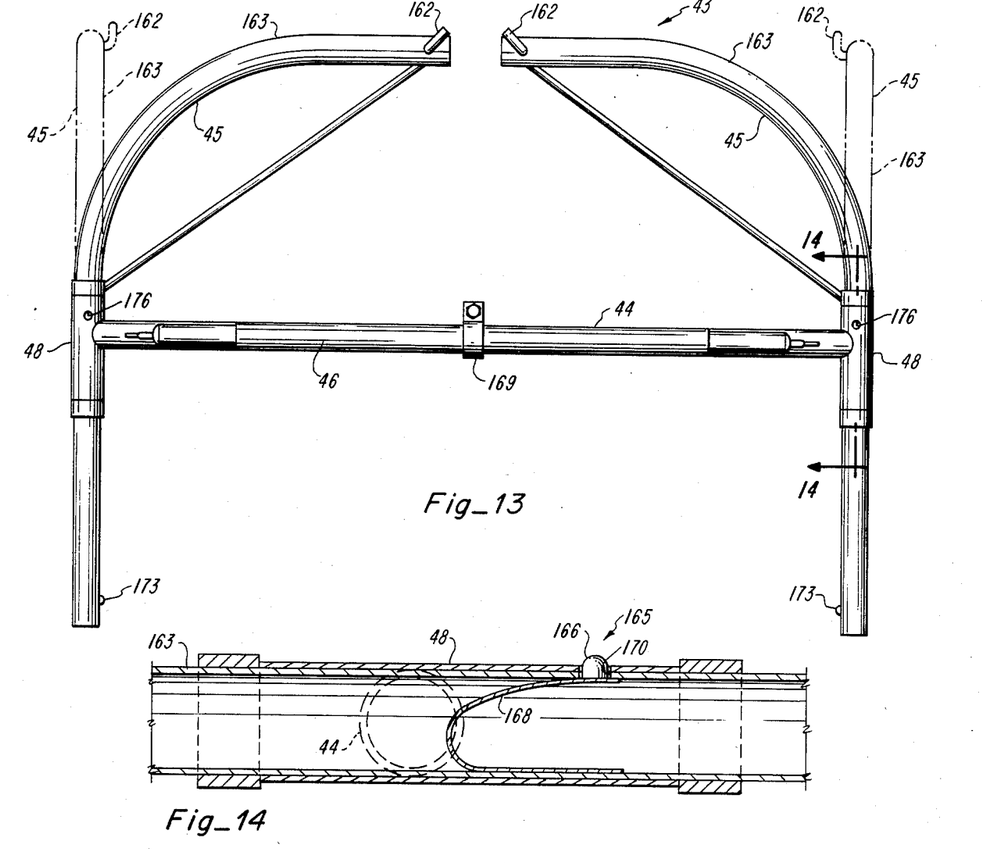
FIG. 13 is a top plan view of the harness supports of the invention shown in FIG. 1 in the storage position, the operating position seen in phantom line.
FIG. 14 is a sectional view taken in the plane of line 14—14 of FIG. 13.

The hitching assembly 43 will now be described (FIGS. 13 and 16). Initially, it will be seen that a right angle protrusion or rod 162 is rigidly connected to a right angle curvilinear tube 163 of the harness support shafts 45. The bar 162 is inserted into a space 164 between the second brace plates 86 and the top runner portion 79 and prevented from withdrawal therefrom upon actuation of the fourth interlock 104 (FIG. 12). This is the manner in which the hitching assembly 43 is connected to the runners 17 and the sleigh 10. The right angle tube 163 of the hitching assembly 43 is pivotable with respect to the exterior sleeve 48. A spring detent mechanism 165, seen in FIG. 14, allows the tube 163 to be pivoted ninety degrees to the operating or the flat storage position by depressing a ball 166 through a selectively aligned hole 170 in the sleeve 48 and shaft 45, the ball connected to a leaf spring 168 connected to the interior of the shaft 45. The respective outer sleeves 48 are rigidly interconnected by the tubular cross member 44.

At the midpoint along the width of the tubular cross member 44, a bracket 169 is rigidly connected and provides for a pivotal connection to the tow bar tree 46.

The tree 46 is adjustable to various sizes of horses. Inserts 191 are insertable into either end of a main tubular body 190 of the tree 46. Each insert 191 has a spring and ball mechanism such as shown in FIGS. 14 and 16. The ball projects into a selected one of a series of holes 192 formed in the body 190 so thereby vary the overall width of the tree 46.

A third detent mechanism 171 including a ball 173 and spring 175, the ball projecting through a selectively aligned hole 176 in the sleeve 51 and support shaft 45, the sleeve 51 fixed to the extension 50, allows for connection of the pole extensions 50 to the harness shafts 45 (FIG. 16). Hold back brackets 176 mounted on the extensions 50 receive the harness 52 and prevent the horse from being struck by the sleigh 10.

The horse is connected to the hitching assembly 43 in a conventional manner by the harness 52, which will not be discussed in great detail. The bridle 53, reins 54, belly strap 55, hind quarter strap 56 and tow line 57 are all connectable to the pole extensions 50 and the tow bar 46. The reins 54 are held by the rider of the sleigh 10 and used in a well known manner to dictate the course, speed and direction of travel.

It is therefore seen that the sleigh 10 of the present invention can be reduced to generally flat planar pieces comprising the upper body 21 as seen in FIG. 2. The floorboard 11 and runners 17 are adaptable to be collapsed to a storage position, also generally planar. The front panel 31 is releasable from the floorboard 11 and the runners 17 into still another generally flat planar element. The pole extensions 50 are releasable from the hitching assembly 43 to shorten their length and the harness supports 45 are pivotable to a generally flat planar configuration for storage and transport.

Although the present invention has been described with a certain degree of particularity, nothing contained therein should serve to limit the scope of the present invention, particularly as set forth in the appended claims.

What is claimed is:

1. A sleigh adapted to be pulled over a snow surface by at least one horse comprising in combination:
    a generally rectangular flat planar floorboard having a front edge, a rear edge and two side edges;
    a pair of longitudinally extending runners, each operably connected to said floorboard near each of said side edges between an operating position, wherein said runners support said floorboard at a raised position above said snow surface and a stored position wherein said runners are pivoted at said side edges from said operating position to the stored position, wherein said runners are generally adjacent to and in a parallel plane to that of said floorboard;
    an interlocking body structure mountable to said floorboard including a pair of side panels, each temporarily mountable to said floorboard and a back panel connecting said side panels together, a vertical seat piece connected at a spaced distance forward of said rear panel to said side panels and interlocking same, and a horizontal seat piece adapted to slidingly connect to said side panels; and
    a front panel releasably connected to the floorboard along the front edge and further releasably connected to said runners, said releasable connection between said runners and said front panel providing a connection to a hitching assembly connectable to said horse.

2. The invention as defined in claim 1 wherein said connection between said floorboard and said runners further includes:
    a runner frame mountable to a bottom surface of said floorboard, said frame having at least two transverse members and at least two longitudinal members integrally connected to each other; and
    a pair of sliding yokes adapted to slide along each of said transverse members, each of said yokes operatively connected to one of said runners by a connecting rod providing pivotal connection at one end to said runner and at the other end to said yoke.

3. The invention as defined in claim 2 wherein said yokes in said operating position are interconnected by locking means.

4. The invention as defined in claim 3 wherein said locking means further includes:
    a longitudinal slide adapted to slide along the bottom surface of said floorboard at a position near the position of said sliding yokes while the runners are held in the operating position; and
    a rod rigidly connected to said slide adapted to project through concentric holes formed in said sliding yokes.

5. The invention as defined in claim 4 wherein said slide includes a perpendicular tab relative thereto passing through the floorboard and above a top surface of said floorboard, said tab adapted to be abutted by the rear panel to thereby prevent unlocking of said runners.

6. The invention as defined in claim 1 wherein said interlocking body structure further includes:
    a lower and upper piece forming said back panel, said lower and upper pieces being slidably connected to said side panels along grooves defined at a generally rear edge of said side panels, at least one of said lower and upper panels having releasable connection means to said side panels, said upper panel having a locking block mounted along a lower edge thereof, said horizontal seat piece being slidable in a second generally horizontal groove formed in each of said side panels, said horizontal seat piece fitting in a superimposed relationship above said locking block to thereby prevent removal of said upper panel from said first mentioned groove, said vertical seat piece slidable in a third generally vertical groove formed in each of said side panels, said horizontal seat piece preventing said vertical seat piece from being removed from the third seat groove, said vertical seat piece further having additional releasable connection means for interconnecting said side panels.

7. The invention defined in claim 6 wherein said horizontal seat piece is locked in position by a lever arm pivotally connected to said horizontal seat piece, said lever arm including a ramp to slidably engage said vertical piece and a notch into which notch the vertical piece fits to prevent sliding movement of said horizontal piece.

8. The invention defined in claim 1 wherein said front panel includes a generally rectangular planar windshield and a pair of arcuate tubular runner portions hingeably connected thereto, said runner portions being interconnected by a lateral support member, said lateral support member having at a midpoint thereof a pivotally connected pivot arm having at either end thereof a pivotally connected radius arm, said radius arm adapted to pass through a hole in a terminal end of each of said runner portions, said runner portions adapted to be matingly received in a generally conformable relationship with said runners, said runners further having a hole alignable with the hole in said runner portions, said windshield being connectable along a front edge of said floorboard, said runner portions being connectable to said runners by pivoting said pivot arm and inserting an end of said radius arm through the holes in said runner portion and said runners.

9. The invention as defined in claim 8 wherein said connection between said windshield and said floorboard further includes a notch at the intersection of said forward edge and said side edges of said floorboard for receipt of terminal ends of said windshield, said terminal ends of said windshield having a laterally projecting pin adapted to be received by a plate bracket connected to a top portion of said runners and located generally at the position of said notch in said floorboard, said plate having a rearwardly open mouth for receipt of said pins, upon receipt of said pins and actuation of said pivot arm of said runner portion, the terminal end of said windshield being abutted against said notch, thereby preventing movement of said terminal end relative to said plate and said notch.

10. The invention as defined in claim 8 wherein a top portion of said runners has mounted thereon a plate having a forwardly open space, said space adapted to receive a right angle projection of said hitching assembly, said right angle projection integrally connected to said hitching assembly.

11. The invention as defined in claim 1 wherein said hitching assembly includes a pair of harness support shafts rotatable with respect to a pair of sleeves, said sleeves interconnected by a cross member.

12. The invention as defined in claim 11 wherein said rotatable movement between said shafts relative to said sleeve is selectively allowed or prevented by a spring detent mechanism.

13. The invention as defined in claim 11 wherein said support shafts include pole extensions releasably connected thereto, and a tow bar pivotally connected to said cross member, said pole extensions and said tow bars defining means for connecting said horse to said sleigh by use of a harness.

14. The invention as defined in claim 13 wherein said tow bar includes a tubular main body with holes formed along the length thereof and a pair of tabular inserts having a spring and ball mechanism connected thereto, the ball of said spring and ball mechanism projecting through a selected one of said holes in said main body.

15. A sleigh adapted to be pulled over a snow surface by at least one horse including a generally planar floorboard having pivotally connected thereto a pair of longitudinally extending runners and releasably connected thereto an upper body, a front panel and a hitching assembly, to which hitching assembly a horse is connected, said upper body including a pair of side panels, a back panel, a horizontal seat piece and a vertical seat piece, all interconnected to each other and to said floorboard defining first interlock means, the upper body mounted on said floorboard defining a second interlocking means for maintaining a third interlocking means in a locked position, said third interlocking means locking said runners in an operating position, and fourth interlocking means for securing said front panel to said runners and said floorboard and said hitching assembly to said runners.

16. The invention as defined in claim 15 wherein said first interlocking means further includes:
temporary connection means for connecting said side panels to said floorboard, a rear groove constructed in said side panels into which a lower piece and an upper piece of said back panel are slidable along, said lower piece including a support block adapted to engage the rear edge of said floorboard and said upper piece including a locking block at a bottom edge thereof, said lower and upper pieces further including releasable lateral connection means for connection to both of said side panels, said side panels further including a generally horizontally oriented groove for receipt of said horizontal seat piece, a rearward edge of said seat panel abutting over said locking block, said side panels further having a vertically aligned groove for receipt of side edges of said vertical seat piece, said vertical seat panel having lateral connection means for connection to said side panels.

17. The invention defined in claim 16 wherein said generally horizontally oriented groove slopes downwardly and rearwardly to apply a gravity force on the horizontal seat piece against the locking block.

18. The invention as defined in claim 15 wherein said third interlocking means further includes a runner support frame secured at a spaced relationship from a bottom surface of said floorboard, said runner support frame having transverse members and longitudinal members, at least one of said transverse members having a pair of yokes having a tubular portion matable against an outer surface of said transverse portions for slidable movement therealong, each of said yokes further having a plate projecting parallel to the transverse members, said plate having a hole defined therein, each yoke pivotally connected to a connecting rod which is in turn pivotally connected to one of said runners, the yoke slidable along said transverse member toward the other of said runners from that to which the yoke is pivotally connected to allow said runners to assume a storage position, the holes in said plates of said yokes on a given transverse member being aligned upon the runners assuming an upright operating position, said holes engaged by a locking bar, said locking bar attached to a slide member extending longitudinally the length of said floorboard and attached to the bottom surface thereof, said slide member passing above said transverse members, said locking bar adapted to be inserted into the hole in said plate of said yoke, said slide further including a pull tab at a rear end thereof, said pull tab extending through a notch formed at the rear edge of said floorboard, said pull tab adapted to be pulled rearwardly to pull said locking bar from said hole and allow said runners to pivot relative to said floorboard, said pull tab further adapted to be pushed to engage said locking bar through said holes of said yokes to prevent sliding movement of said yokes along said transverse members.

19. The invention as defined in claim 18 wherein said second interlocking means includes assembly of said upper body in a position abutting said pull tab wherein said pull tab held is in the locked position.

20. The invention as defined in claim 15 wherein said fourth interlocking means includes a front panel connectable along a forward edge of said floorboard, said front panel having hingeably connected thereto a pair of runner portions adapted to connect to the runners of said sleigh, said runner portions having selectable locking means for securing said runner portion to said runners, said runner portion securing to said runner defining locking means for connecting a hitching assembly to said runners, said hitching assembly being connectable to said horse.

21. A sleigh to be pulled by at least one horse over a snow covered landscape that disassembles into a plurality of generally planar pieces for storage and transport comprising in combination:
   a planar floorboard;
   a pair of runners pivotally connected to said floorboard including means for maintaining said runners in an operating position;
   an upper body mounted on said floorboard formed from a plurality of flat planar pieces interlocked together, said upper body locking said runners in the operating position;
   a front panel releasably connected to said floorboard and said runners;
   a hitching assembly selectively connected to said runners; and
   a harness connectable to said hitching assembly and said horse.

22. A sleigh to be pulled by at least one horse over a snow covered landscape that disassembles into a plurality of generally planar pieces for storage and transport comprising in combination:
   a planar floorboard;
   a pair of runners pivotably connected to said floorboard including means for maintaining said runners in an operating position;
   an upper body formed from a plurality of flat planar pieces interlocked together;
   a front panel releasably connected to said floorboard and said runners;
   a hitching assembly connected to said runners by the connection of said front panel to said floorboard and runners; and
   a harness connectable to said hitching assembly and said horse.

* * * * *